United States Patent
Yiming et al.

(10) Patent No.: US 12,067,174 B2
(45) Date of Patent: Aug. 20, 2024

(54) TEXT INPUT SYNCHRONIZATION FOR REMOTE APPLICATIONS

(71) Applicant: Citrix Systems, Inc., Fort Lauderdale, FL (US)

(72) Inventors: Wang Yiming, Nanjing (CN); Tao Yin, Nanjing (CN); Cungang Lin, Nanjing (CN); Hao Wu, Nanjing (CN); Sujie Li, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/481,746

(22) Filed: Sep. 22, 2021

(65) Prior Publication Data

US 2023/0056176 A1 Feb. 23, 2023

Related U.S. Application Data

(63) Continuation of application No. PCT/CN2021/112941, filed on Aug. 17, 2021.

(51) Int. Cl.
*G06F 3/023* (2006.01)
*G06F 3/0481* (2022.01)
*G06F 3/14* (2006.01)

(52) U.S. Cl.
CPC .......... *G06F 3/0236* (2013.01); *G06F 3/0481* (2013.01); *G06F 3/1454* (2013.01)

(58) Field of Classification Search
CPC ..... G06F 3/0236; G06F 3/0481; G06F 3/1454
See application file for complete search history.

(56) References Cited

U.S. PATENT DOCUMENTS

| 7,870,496 | B1 * | 1/2011 | Sherwani | ................ H04L 67/38 |
| | | | | 715/740 |
| 8,922,490 | B2 * | 12/2014 | Davidson | ............ G06F 3/04895 |
| | | | | 345/168 |

(Continued)

FOREIGN PATENT DOCUMENTS

| CN | 102834819 A | 12/2012 |
| CN | 107179952 B | 3/2021 |

(Continued)

OTHER PUBLICATIONS

MDN Web Docs, "Input method editor", Jun. 8, 2023, https://developer.mozilla.org/en-US/docs/Glossary/Input_method_editor (Year: 2023).*

(Continued)

*Primary Examiner* — Kenny Nguyen

(57) ABSTRACT

In some embodiments, a method includes: receiving, by a first computing device, text composed using a composition window of a second computing device; entering, by the first computing device, the composed text into a text input of an application executing on the first computing device; determining, by the first computing device, one or more attributes of a cursor of the text input, the one or more attributes of the cursor including at least a position of the cursor; and sending, by the first computing device, the one or more attributes of the cursor to the second computing device, the second computing device configured to display the application and to position the composition window relative to the displayed application based on the position of the cursor determined by the first computing device.

21 Claims, 12 Drawing Sheets

(56) References Cited

U.S. PATENT DOCUMENTS

| | | | |
|---|---|---|---|
| 9,300,720 B1 | 3/2016 | Qiu | |
| 9,553,953 B2* | 1/2017 | Sullad | G06F 3/0484 |
| 9,578,113 B2* | 2/2017 | Sullad | H04L 63/0407 |
| 10,057,206 B2* | 8/2018 | Naidu | H04L 51/16 |
| 10,200,337 B2* | 2/2019 | Naidu | H04L 51/16 |
| 2008/0115046 A1* | 5/2008 | Yamaguchi | G06F 40/53 |
| | | | 715/201 |
| 2009/0237728 A1* | 9/2009 | Yamamoto | H04N 1/00474 |
| | | | 358/1.15 |
| 2010/0309137 A1* | 12/2010 | Lee | G06F 3/018 |
| | | | 345/171 |
| 2011/0307772 A1* | 12/2011 | Lloyd | G06F 40/143 |
| | | | 715/234 |
| 2012/0011280 A1* | 1/2012 | Gilboa | G06F 9/451 |
| | | | 709/246 |
| 2012/0210261 A1* | 8/2012 | Sarnoff | G06F 3/04883 |
| | | | 715/765 |
| 2012/0306747 A1* | 12/2012 | Davidson | G06F 3/04895 |
| | | | 345/160 |
| 2014/0013234 A1* | 1/2014 | Beveridge | G06F 9/452 |
| | | | 715/740 |
| 2014/0111434 A1* | 4/2014 | Yang | G06F 3/018 |
| | | | 345/160 |
| 2014/0359003 A1* | 12/2014 | Sullad | H04L 63/08 |
| | | | 709/203 |
| 2015/0106702 A1* | 4/2015 | Scott | G06F 40/166 |
| | | | 715/265 |
| 2015/0121291 A1* | 4/2015 | Scott | G06F 16/3322 |
| | | | 715/780 |
| 2016/0323217 A1* | 11/2016 | Subramani | G06F 40/274 |
| 2017/0220688 A1 | 8/2017 | Zeung | |
| 2017/0302610 A1* | 10/2017 | Naidu | H04L 51/16 |
| 2018/0331995 A1* | 11/2018 | Naidu | H04L 51/16 |
| 2019/0124037 A1* | 4/2019 | Naidu | H04L 51/16 |
| 2019/0332255 A1* | 10/2019 | Wang | G06F 3/04883 |

FOREIGN PATENT DOCUMENTS

| | | |
|---|---|---|
| CN | 112491974 A | 3/2021 |
| JP | 2015148852 | 8/2015 |
| JP | 2015158719 A | 9/2015 |
| KR | 20040089600 A | 10/2004 |
| WO | 2015130027 A1 | 9/2015 |

OTHER PUBLICATIONS

Input Method Editor API, W3C Working Group Note, http://www.w3.org/TR/2016/NOTE-ime-api-20160524/, May 24, 2016, 23 pages.
International Search Report and Written Opinion issued in App. No. PCT/CN2021/112934, mailing date Apr. 25, 2022, 8 pages.

* cited by examiner

TEXT INPUT SYNCHRONIZATION FOR REMOTE APPLICATIONS

CROSS REFERENCE TO RELATED APPLICATION

This application is a continuation of and claims the benefit of PCT Patent Application No. PCT/CN2021/112941 filed on Aug. 17, 2021 in the English language in the State Intellectual Property Office and designating the United States, the contents of which are hereby incorporated herein by reference in its entirety.

BACKGROUND

A server running on a network of an enterprise may provide services to remote clients. The services may include applications and desktops running locally on the server and accessed by the remote clients over the network. Such applications and desktops may be virtualized, meaning that they run within a virtual computing environment provided by the server. Clients may access applications and desktops running remotely on a server via a remote display protocol, such as the Independent Computing Architecture (ICA) or the Remote Desktop Protocol (RDP). Different types of clients for accessing remote applications and desktops exist, including native applications and browser-based clients such as HTML5 clients.

An input method editor (IME) is an operating system component or program that enables users to generate characters not natively available on their input devices (e.g., physical or virtual keyboard) by using sequences of characters that are natively available on their input devices. Using an IME may be necessary for languages that have more graphemes than there are keys on the keyboard, such as Chinese, Japanese, and Korean (CJK) languages.

SUMMARY

Described herein are embodiments and systems and methods for synchronizing text inputs between clients and remote applications and desktops using a remote display protocol, such as ICA or RDP. Disclosed embodiments can be used to synchronize a text input provided by a client-side input method editor (IME) with a remote text input of an application running on a server.

According to one aspect of the present disclosure, a method can include: receiving, by a first computing device, text composed using a composition window of a second computing device; entering, by the first computing device, the composed text into a text input of an application executing on the first computing device; determining, by the first computing device, one or more attributes of a cursor of the text input, the one or more attributes of the cursor including at least a position of the cursor; and sending, by the first computing device, the one or more attributes of the cursor to the second computing device, the second computing device configured to display the application and to position the composition window relative to the displayed application based on the position of the cursor determined by the first computing device.

In some embodiments, the composition window may be part of an input method editor (IME) executing on the second computing device. In some embodiments, the second computing device can be configured to position a candidates window relative to the displayed application based on the position of the cursor determined by the first computing device, wherein the candidates window may also be part of the IME executing on the second computing device. In some embodiments, the receiving of the text composed using the second computing device may include receiving the composed text over a channel of a remote display protocol. In some embodiments, the remote display can include a keyboard channel separate from the channel over which the composed text is received.

In some embodiments, the method can include initiating, by the first computing device, a composition session with a second computing device, the composition session associated with the application executing on the first computing device. In some embodiments, the method can include receiving, by the first computing device, a request for the one or more attributes of the cursor, wherein the sending of the one or more attributes of the cursor to the second computing device can be responsive to the receiving the request for the one or more attributes of the cursor. In some embodiments, the method can include: responsive to detecting a change in the position of the cursor, sending the changed position of the cursor to the second computing device. In some embodiments, the one or more attributes of the cursor may include a height of the cursor, wherein the second computing device can be configured to adjust a font size of the composition window based on the height of the cursor. In some embodiments, the application can be a web application and the text input can be HTML element of the web application. In some embodiments, the application may be executing within a virtual machine (VM) on the first computing device.

According to one aspect of the present disclosure, a method can include: sending, by a first computing device, text composed using a composition window of the first computing device to a second computing device, the second computing device configured to enter the composed text into a text input of an application executing on the second computing device and to determine one or more attributes of a cursor of the text input, the one or more attributes of the cursor including at least a position of the cursor; and receiving, by the first computing device, the one or more attributes of the cursor from the second computing device, the first computing device displaying the application executing on the second computing device; and positioning, by the first computing device, the composition window relative to the displayed application based on the position of the cursor determined by the second computing device.

In some embodiments, the composition window may be part of an input method editor (IME) executing on the first computing device. In some embodiments, the method can include: positioning, by the first computing device, a candidates window relative to the displayed application based on the position of the cursor determined by the second computing device, wherein the candidates window may also be part of the IME executing on the first computing device. In some embodiments, the sending of the text composed using the first computing device may include sending the composed text over a channel of a remote display protocol. In some embodiments, the remote display can include a keyboard channel separate from the channel over which the composed text is received.

In some embodiments, the method can include initiating, by the first computing device, a composition session with a second computing device, the composition session associated with the application executing on the second computing device. In some embodiments, the method can include sending, by the first computing device, a request for the one or more attributes of the cursor, wherein the receiving of the one or more attributes of the cursor to the second computing device can be responsive to the sending of the request for the one or more attributes of the cursor. In some embodiments, the one or more attributes of the cursor may include a height of the cursor, wherein the first computing device can be configured to adjust a font size of the composition window based on the height of the cursor.

According to one aspect of the present disclosure, a computing device can include a processor a non-volatile memory storing computer program code that when executed on the processor causes the processor to execute a process comprising one or more of the methods previously described.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
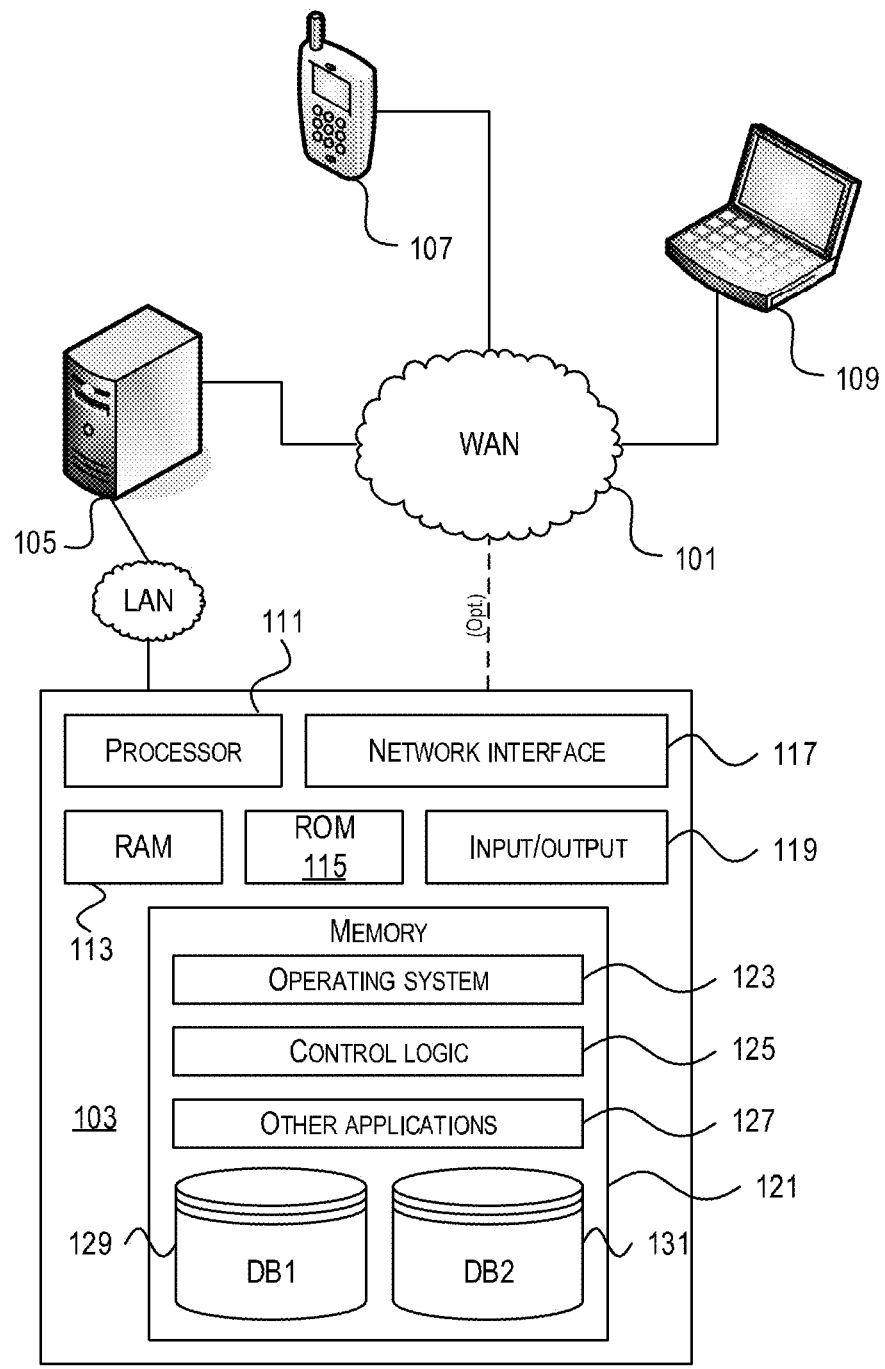
FIG. 1 depicts an illustrative computer system architecture that may be used in accordance with one or more illustrative aspects of the concepts described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects of the concepts described herein in a standalone and/or networked environment. Various network node devices 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topologies and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components and devices which make up the system of FIG. 1 may include data server 103, web server 105, and client computers 107, 109. Data server 103 provides overall access, control and administration of databases and control software for performing one or more illustrative aspects of the concepts described herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used in the system architecture and data processing device of FIG. 1, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) interfaces 119 may include a variety of interface units and drives for reading, writing, displaying, and/or printing data or files. Memory 121 may store operating system software 123 for controlling overall operation of the data server 103, control logic 125 for instructing data server 103 to perform aspects of the concepts described herein, and other application software 127 providing secondary, support, and/or other functionality which may or might not be used in conjunction with aspects of the concepts described herein. The control logic 125 may also be referred to herein as the data server software. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the concepts described herein. Memory 121 may include, for example, a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to data server 103. Those of skill in the art will appreciate that the functionality of data server 103 (or device 105, 107, or 109) as described herein may be spread across multiple data processing devices, for example, to distribute processing load across multiple computers, to segregate transactions based on geographic location, user access level, quality of service (QoS), etc.

One or more aspects of the concepts described here may be embodied as computer-usable or readable data and/or as computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) Hypertext Markup Language (HTML) or Extensible Markup Language (XML). The computer executable instructions may be stored on a computer readable storage medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source node and a destination node (e.g., the source node can be a storage or processing node having information stored therein which information can be transferred to another node referred to as a "destination node"). The media can be transferred in the form of electromagnetic waves traveling through signal-conducting media such as metal wires, optical fibers, and/or wireless transmission media (e.g., air and/or space). Various aspects of the concepts described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects of the concepts described herein, and such data structures are contemplated within the scope of computer executable instructions and computer-usable data described herein.

Figure 2:
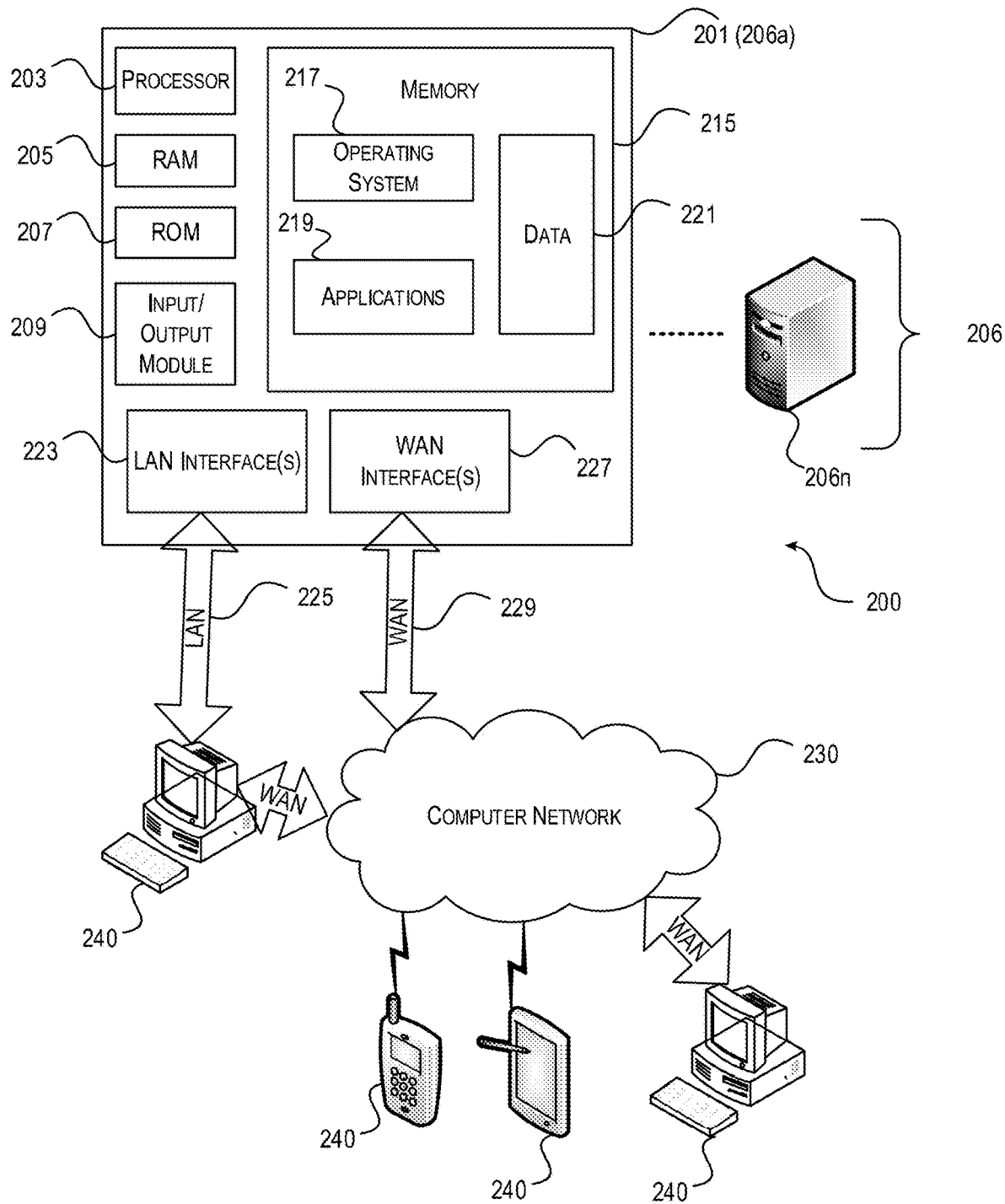
FIG. 2 depicts an illustrative remote-access system architecture that may be used in accordance with one or more illustrative aspects of the concepts described herein.

With further reference to FIG. 2, one or more aspects of the concepts described herein may be implemented in a remote-access environment. FIG. 2 depicts an example system architecture including a computing device 201 in an illustrative computing environment 200 that may be used according to one or more illustrative aspects of the concepts described herein. Computing device 201 may be used as a server 206a in a single-server or multi-server desktop virtualization system (e.g., a remote access or cloud system) configured to provide VMs for client access devices. The computing device 201 may have a processor 203 for controlling overall operation of the server and its associated components, including RAM 205, ROM 207, input/output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all the elements described above with respect to the data server 103 or computing device 201. The network connections depicted in FIG. 2 include a local area network (LAN) 225 and a wide area network (WAN) 229 but may also include other networks. When used in a LAN networking environment, computing device 201 may be connected to the LAN 225 through an adapter or network interface 223. When used in a WAN networking environment, computing device 201 may include a modem or other wide area network interface 227 for establishing communications over the WAN 229, such as to computer network 230 (e.g., the Internet). It will be appreciated that the network connections shown are illustrative and other means of establishing a communication link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects of the concepts described herein may also be operational with numerous other general purpose or special purpose computing system environments or configurations. Examples of other computing systems, environments, and/or configurations that may be suitable for use with aspects of the concepts described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more terminals 240 may be in communication with one or more servers 206a-206n (generally referred to herein as "server(s) 206"). In one embodiment, the computing environment 200 may include a network appliance installed between the server(s) 206 and terminals 240. The network appliance may manage client/server connections, and in some cases can load balance client connections amongst a plurality of back-end servers 206.

The terminals 240 may in some embodiments be referred to as a single computing device or a single group of client computing devices, while server(s) 206 may be referred to as a single server 206 or a group of servers 206. In one embodiment, a single terminal 240 communicates with more than one server 206, while in another embodiment a single server 206 communicates with more than one terminal 240. In yet another embodiment, a single terminal 240 communicates with a single server 206.

A terminal 240 can, in some embodiments, be referred to as any one of the following non-exhaustive terms: client machine(s); client(s); client computer(s); client device(s); client computing device(s); local machine; remote machine; client node(s); endpoint(s); or endpoint node(s). The server 206, in some embodiments, may be referred to as any one of the following non-exhaustive terms: server(s), local machine; remote machine; server farm(s), or host computing device(s).

In one embodiment, the terminal 240 may be a VM. The VM may be any VM, while in some embodiments the VM may be any VM managed by a Type 1 or Type 2 hypervisor, for example, a hypervisor developed by Citrix Systems, IBM, VMware, or any other hypervisor. In some aspects, the VM may be managed by a hypervisor, while in other aspects the VM may be managed by a hypervisor executing on a server 206 or a hypervisor executing on a terminal 240.

Some embodiments include a terminal 240 that displays application output generated by an application remotely executing on a server 206 or other remotely located machine. In these embodiments, the terminal 240 may execute a VM receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Fort Lauderdale, Florida; or the Remote Desktop Protocol (RDP) manufactured by Microsoft Corporation of Redmond, Washington.

A remote computing environment may include more than one server 206a-206n logically grouped together into a server farm 206, for example, in a cloud computing environment. The server farm 206 may include servers 206a-206n that are geographically dispersed while logically grouped together, or servers 206a-206n that are located proximate to each other while logically grouped together. Geographically dispersed servers 206a-206n within a server farm 206 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 206 may be administered as a single entity, while in other embodiments the server farm 206 can include multiple server farms.

In some embodiments, a server farm 206 may include servers that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server, a master application server, a server executing an active directory, or a server executing an application acceleration program that provides firewall functionality, application functionality, or load balancing functionality. Other server types may also be used.

Some embodiments include a first server 206a that receives requests from a terminal 240, forwards the request to a second server 206b (not shown), and responds to the request generated by the terminal 240 with a response from the second server 206b (not shown). First server 206a may acquire an enumeration of applications available to the terminal 240 as well as address information associated with an application server 206 hosting an application identified within the enumeration of applications. First server 206a can present a response to the client's request using a web interface and communicate directly with the terminal 240 to provide the terminal 240 with access to an identified application. One or more terminals 240 and/or one or more servers 206 may transmit data over network 230, e.g., network 101.

Figure 3:
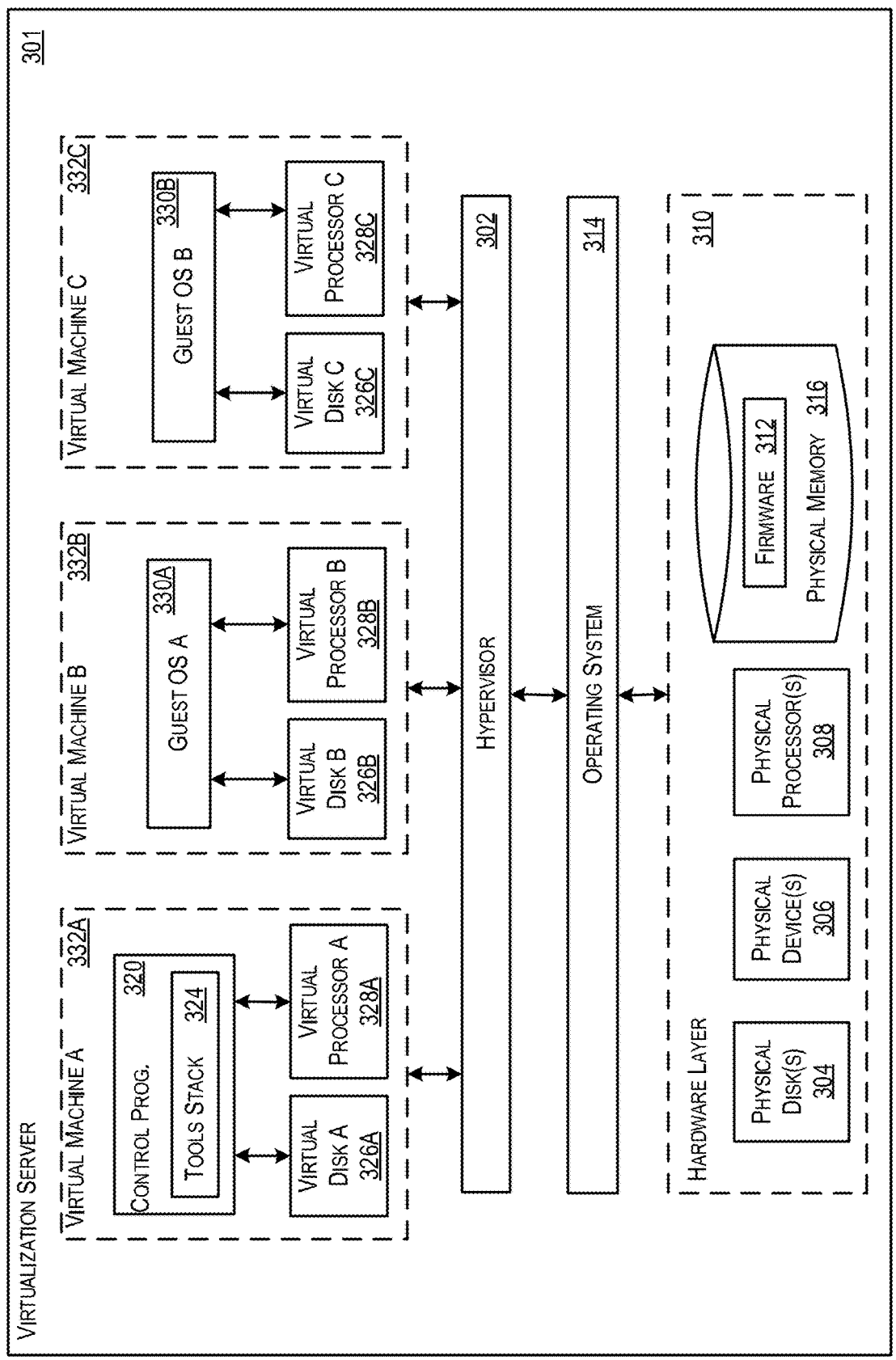
FIG. 3 depicts an illustrative virtualized (hypervisor) system architecture that may be used in accordance with one or more illustrative aspects of the concepts described herein.

FIG. 3 shows a high-level architecture of an illustrative application virtualization system. As shown, the application virtualization system may be single-server or multi-server system, or cloud system, including at least one virtualization server 301 configured to provide virtual desktops and/or virtual applications to one or more terminals 240 (FIG. 2). As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an operating system running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer 310 that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more VMs 332A-C (generally 332). Each VM 332 may have a virtual disk 326A-C and a virtual processor 328A-C. In some embodiments, a first VM 332A may execute, using a virtual processor 328A, a control program 320 that includes a tools stack 324. Control program 320 may be referred to as a control VM, Dom0, Domain 0, or other VM used for system administration and/or control. In some embodiments, one or more VMs 332B-C can execute, using a virtual processor 328B-C, a guest operating system 330A-B.

Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

In some embodiments, hypervisor 302 may be a program executed by processors 308 on virtualization server 301 to create and manage any number of VMs 332. Hypervisor 302 may be referred to as a VM monitor, or platform virtualization software. In some embodiments, hypervisor 302 can be any combination of executable instructions and hardware that monitors VMs executing on a computing machine. Hypervisor 302 may be Type 2 hypervisor, where the hypervisor executes within an operating system 314 executing on the virtualization server 301. VMs may execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301 and may include program data stored in the physical memory 316.

Hypervisor 302, in some embodiments, can provide virtual resources to operating systems 330 or control programs 320 executing on VMs 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute VMs that provide access to computing environments. In still other embodiments, hypervisor 302 may control processor scheduling and memory partitioning for a VM 332 executing on virtualization server 301. In some embodiments, virtualization server 301 may execute a hypervisor 302 that creates a VM platform on which guest operating systems may execute. In these embodiments, the virtualization server 301 may be referred to as a host server. An example of such a virtualization server is the Citrix Hypervisor provided by Citrix Systems, Inc., of Fort Lauderdale, Florida.

Hypervisor 302 may create one or more VMs 332B-C (generally 332) in which guest operating systems 330 execute. In some embodiments, hypervisor 302 may load a VM image to create a VM 332. In other embodiments, the hypervisor 302 may execute a guest operating system 330 within VM 332. In still other embodiments, VM 332 may execute guest operating system 330.

In addition to creating VMs 332, hypervisor 302 may control the execution of at least one VM 332. In other embodiments, hypervisor 302 may present at least one VM 332 with an abstraction of at least one hardware resource provided by the virtualization server 301 (e.g., any hardware resource available within the hardware layer 310). In other embodiments, hypervisor 302 may control the way VMs 332 access physical processors 308 available in virtualization server 301. Controlling access to physical processors 308 may include determining whether a VM 332 should have access to a processor 308, and how physical processor capabilities are presented to the VM 332.

As shown in FIG. 3, virtualization server 301 may host or execute one or more VMs 332. A VM 332 is a set of executable instructions that, when executed by a processor 308, may imitate the operation of a physical computer such that the VM 332 can execute programs and processes much like a physical computing device. While FIG. 3 illustrates an embodiment where a virtualization server 301 hosts three VMs 332, in other embodiments virtualization server 301 can host any number of VMs 332. Hypervisor 302, in some embodiments, may provide each VM 332 with a unique virtual view of the physical hardware, memory, processor, and other system resources available to that VM 332. In some embodiments, the unique virtual view can be based on one or more of VM permissions, application of a policy engine to one or more VM identifiers, a user accessing a VM, the applications executing on a VM, networks accessed by a VM, or any other desired criteria. For instance, hypervisor 302 may create one or more unsecure VMs 332 and one or more secure VMs 332. Unsecure VMs 332 may be prevented from accessing resources, hardware, memory locations, and programs that secure VMs 332 may be permitted to access. In other embodiments, hypervisor 302 may provide each VM 332 with a substantially similar virtual view of the physical hardware, memory, processor, and other system resources available to the VMs 332.

Each VM 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each VM 332 with a unique view of the physical disks 304. Thus, in these embodiments, the particular virtual disk 326 included in each VM 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all the same characteristics of at least one physical processor 308. In other embodiments, virtual processor 328 provides a modified view of physical processors 308 such that at least some of the characteristics of the virtual processor 328 are different than the characteristics of the corresponding physical processor 308.

Figure 4:
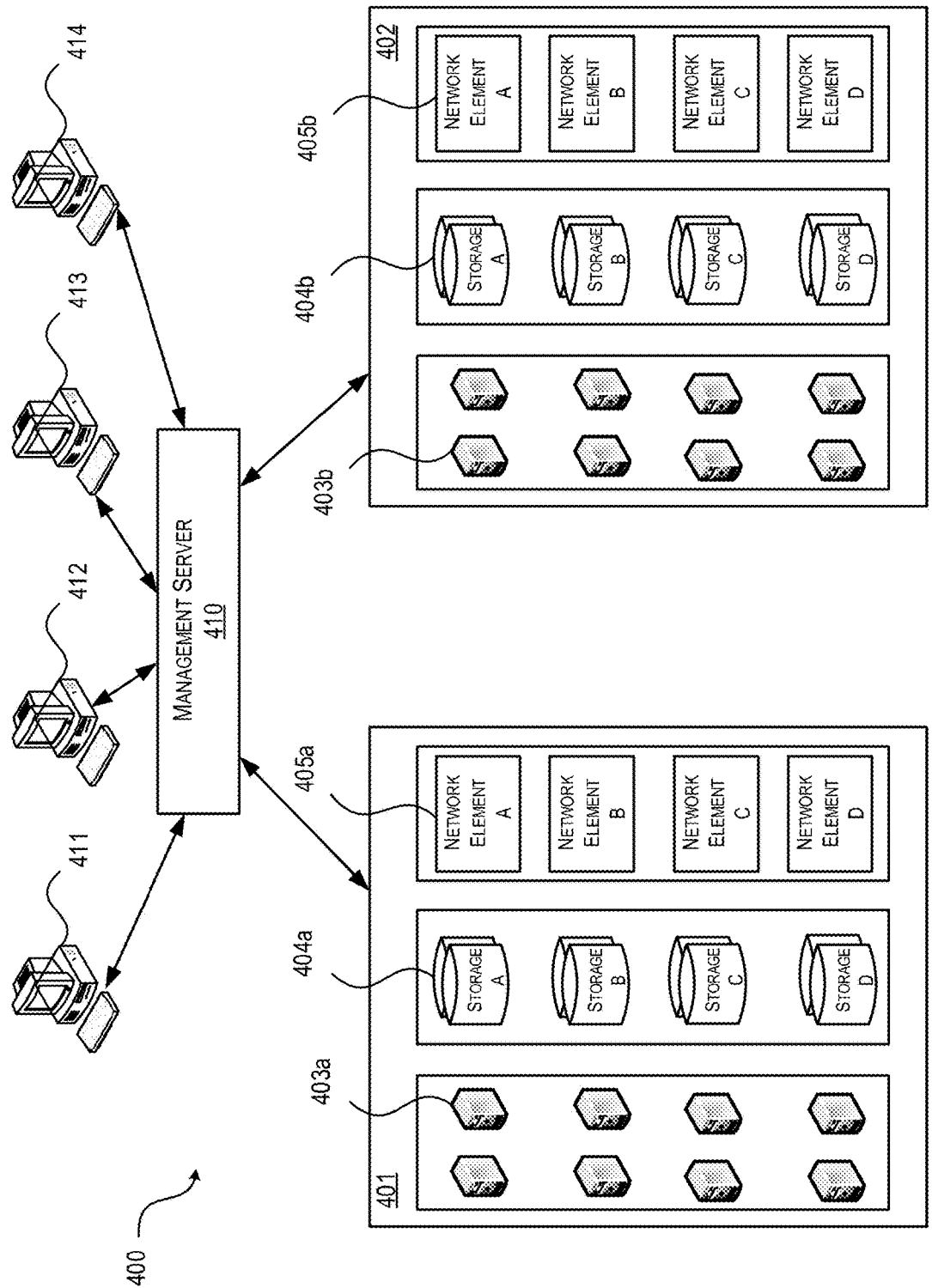
FIG. 4 depicts an illustrative cloud-based system architecture that may be used in accordance with one or more illustrative aspects of the concepts described herein.

With further reference to FIG. 4, some aspects of the concepts described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403*a*-403*b* (generally referred to herein as "host servers 403"), storage resources 404*a*-404*b* (generally referred to herein as "storage resources 404"), and network resources 405*a*-405*b* (generally referred to herein as "network resources 405")) of the cloud system.

Management server 410 may be implemented on one or more physical servers. The management server 410 may include, for example, a cloud computing platform or solution, such as APACHE CLOUDSTACK by Apache Software Foundation of Wakefield, MA, among others. Management server 410 may manage various computing resources, including cloud hardware and software resources, for example, host servers 403, storage resources 404, and network resources 405. The cloud hardware and software resources may include private and/or public components. For example, a cloud environment may be configured as a private cloud environment to be used by one or more customers or client computers 411-414 and/or over a private network. In other embodiments, public cloud environments or hybrid public-private cloud environments may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy VMs within the cloud environment. Client computers 411-414 may connect to management server 410 via the Internet or some other communication network and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage VMs and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain client computers 411-414 may be related, for example, different client computers creating VMs on behalf of the same end user, or different users affiliated with the same company or organization. In other examples, certain client computers 411-414 may be unrelated, such as users affiliated with different companies or organizations. For unrelated clients, information on the VMs or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud computing resources. For example, zone 401 may be a first cloud datacenter located in California and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud environment (e.g., client computers 411-414) might or might not be aware of the distinctions between zones. For example, an end user may request the creation of a VM having a specified amount of memory, processing power, and network capabilities. The management server 410 may respond to the user's request and may allocate resources to create the VM without the user knowing whether the VM was created using resources from zone 401 or zone 402. In other examples, the cloud system may allow end users to request that VMs (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more host servers 403, such as the virtualization servers 301 (FIG. 3), which may be configured to create and host VM instances. The physical network resources in a cloud zone 401 or 402 may include one or more network resources 405 (e.g., network service providers) comprising hardware and/ or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment 400 shown in FIG. 4 also may include a virtualization layer (e.g., as shown in FIGS. 1-3) with additional hardware and/or software resources configured to create and manage VMs and provide other services to customers using the physical resources in the cloud environment. The virtualization layer may include hypervisors, as described above in connection with FIG. 3, along with other components to provide network virtualizations, storage virtualizations, etc. The virtualization layer may be as a separate layer from the physical resource layer or may share some or all the same hardware and/or software resources with the physical resource layer. For example, the virtualization layer may include a hypervisor installed in each of the host servers 403 with the physical computing resources. Known cloud systems may alternatively be used, e.g., WINDOWS AZURE (Microsoft Corporation of Redmond, Washington), AMAZON EC2 (Amazon.com Inc. of Seattle, Washington), IBM BLUE CLOUD (IBM Corporation of Armonk, New York), or others.

Figure 5:
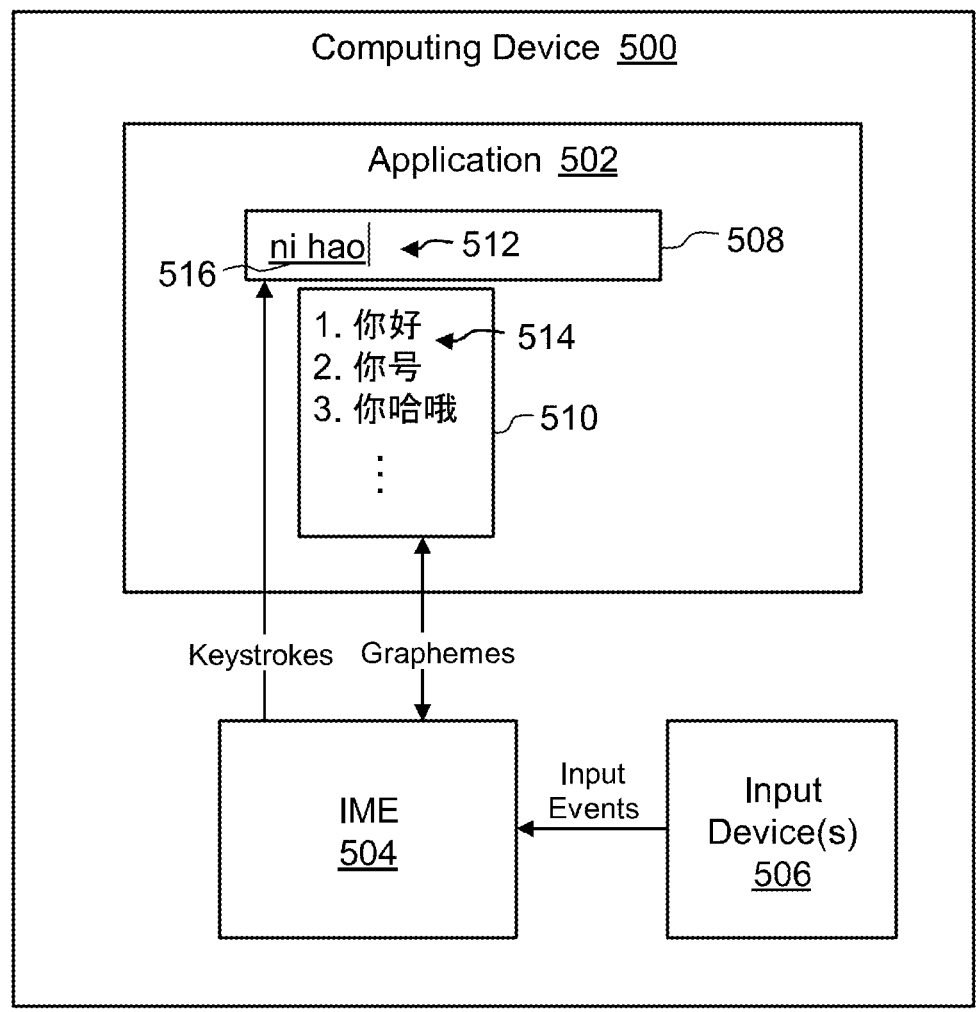
FIG. 5 is a diagram of a conventional input method editor (IME) component used on a computing device.

FIG. 5 illustrates a conventional input method editor (IME) used on a computing device 500. Illustrative computing device 500 can include one more applications (e.g., application 502), one or more IMEs 504, and one or more input devices 506. A given IME 504 can be provided as an operating system (OS) component or as a standalone program, e.g., an application installed on computing device 500 separate from the OS. A user may choose to install on or more IMEs on their computing device 500 that differ in terms of appearance and/or functionality. Applications 502 and IMEs 504 may be embodied as computer-executable instructions stored on a computer readable storage medium (not shown) and executable by one or more processors (not shown) of computing device 500. To promote clarity in the drawings, only one application 502 and one IME 504 are shown in FIG. 5. Moreover, various hardware and/or software components that may be found in a conventional computing device are omitted from FIG. 5 for clarity.

IME 504 can include, or otherwise be associated with, a composition window 508 and a candidates window 510. The composition window 508 and candidates window 510 form the user interface (UI) for the IME. A conventional IME can include additional UI elements not shown in the simplified example of FIG. 5, such as a status window by which a user can set a conversion mode for IME 504 (e.g., which language and/or alphabet is being used by IME 504). In response to keystrokes generated by a user of computing device 500, IME 504 enters corresponding characters into composition window 508. For example, IME 504 may append characters to a composition string 512, which corresponds to the current text (e.g., word or phrase) being entered in the composition window 508. Keystrokes can be received from a physical keyboard, a virtual keyboard, or other type of input device 506.

Candidates window 510 appears in conjunction with the composition window 508 and includes a list of candidate graphemes 514 chosen by IME 504 based on contents of composition string 512. The user can scroll through the candidate graphemes 514 and select a desired grapheme using a mouse, touchscreen, or other input device 506. In some implementations, the candidate graphemes 514 are labeled (e.g., "1," "2," etc.) and the user can press a corresponding key to select a grapheme. In response to the user selecting a candidate grapheme, IME 504 can replace the characters within composition string 512 with the selected grapheme. Candidates window 510 may be positioned below, above, or otherwise near to composition window 508 such that a user can easily view and select candidate graphemes 514 while composing text.

In some cases, composition window 508 and/or candidates window 510 may be implemented by application 502. In more detail, IME 504 may provide an application programming interface (API) that application 502 can use to interface with IME 504. Examples of IME APIs include Input Method Manager (IMM) on WINDOWS and Input Method Editor API, a standard API for web browsers. Using an IME API, application 502 can use an IME functions and messages to create and manage their own IME windows, providing a custom interface while using the conversion capabilities of the IME. In other examples, composition window 508 and/or candidates window 510 may be implemented by IME 504. In the later case, IME 504 may send composition string 512 to application 502 when the user is done composing.

IME 504 may track the status of the composition string 512 over time. This status can include attribute information, clause information, typing information, and the position of the text cursor (also known as the caret). IME 504 can alter one or display attributes of composition string 512 based on the conversion mode, the status of the composition string, and/or other factors. For example, as shown in FIG. 5, IME 504 can instruct application 502 (e.g., by sending a message via an IME API) to apply a particular style of underlining 516 to composition string 512. The underlining 516 may indicate to the user, for example, which language/alphabet is being used for the IME composition and different styles of underlines may be used to distinguish between different languages/alphabets.

Figure 6:
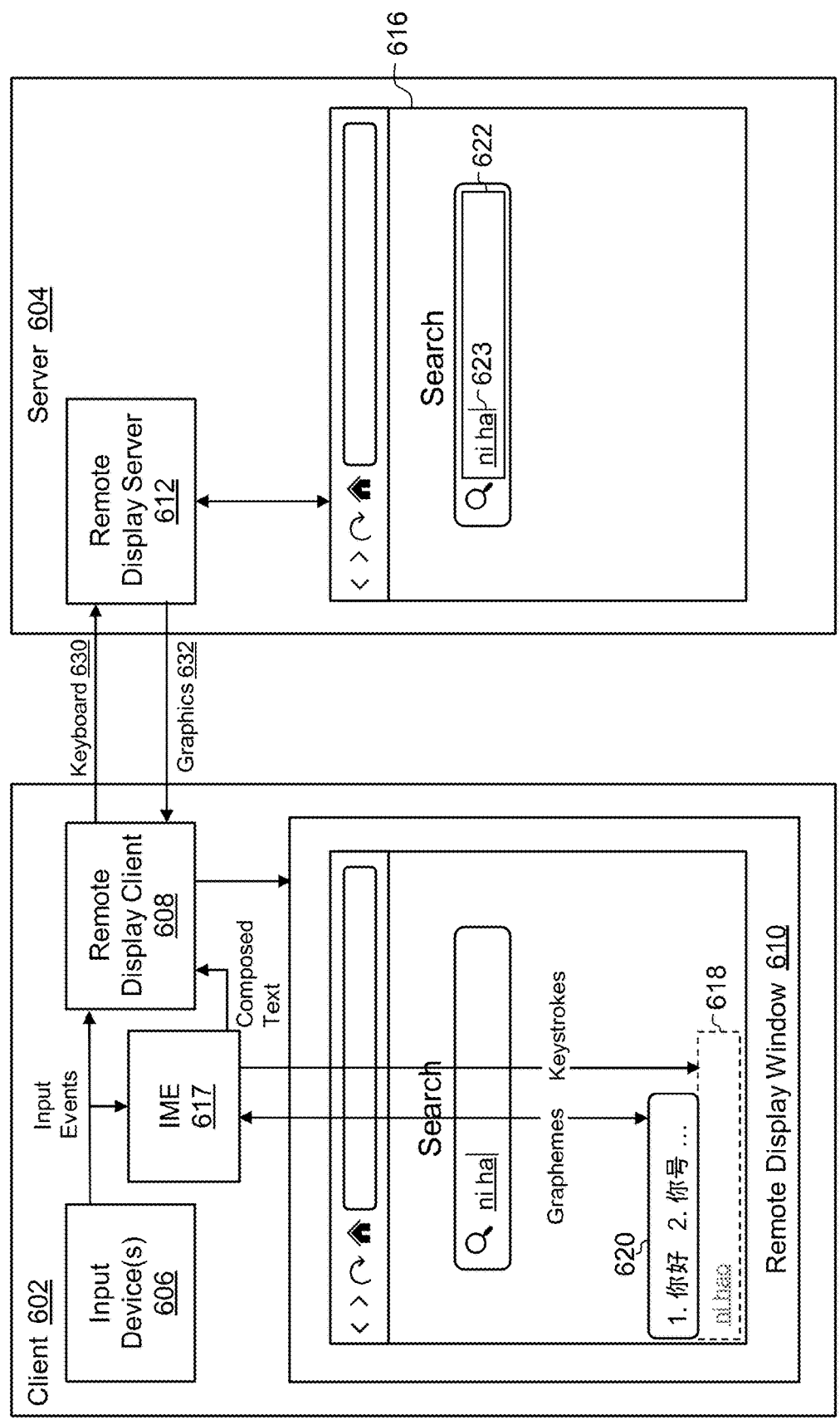
FIG. 6 is a diagram of an IME implementation for remote applications.
Figure 7:
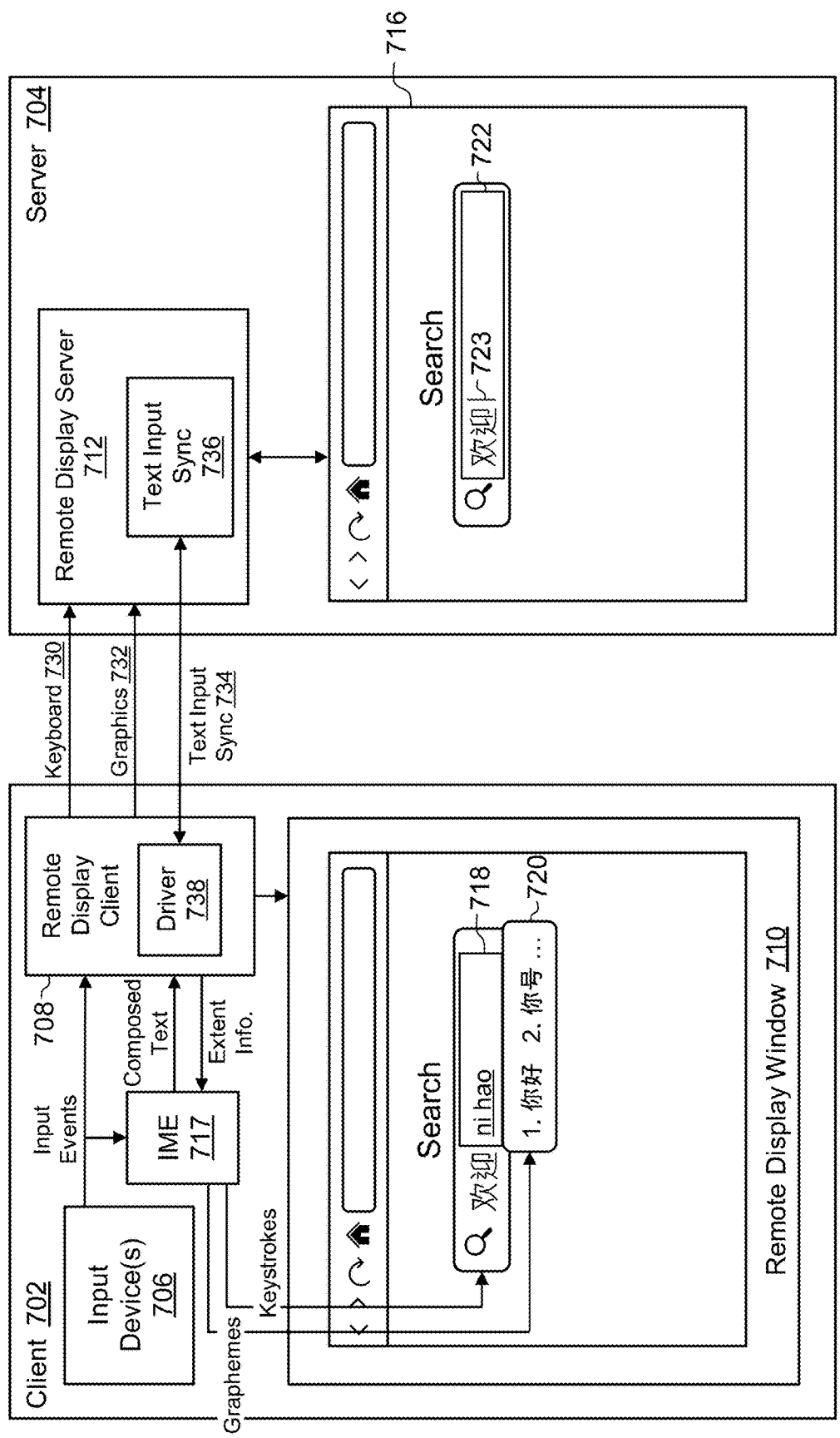
FIG. 7 is a diagram of a client-server environment with text input synchronization, according to embodiments of the present disclosure.

The conventional IME approach described above in the context of FIG. 5 is designed for applications running locally on a computing device. FIGS. 6 and 7 illustrate IME implementations that may be suitable for use with remote application/desktop access (e.g., applications running on server and accessed by a remote client). In FIGS. 6 and 7, like elements are identified using like reference numerals.

FIG. 6 shows an example of an IME implementation that can be used with remote applications. An illustrative computing environment 600 includes a client 602 and a server 604 which may be connected via one or more computer networks (not shown) such as the Internet or another wide area network (WAN). As such, client 602 and server 604 may be considered as being remote from each other. In the example shown, client 602 accesses an application 616 running on server 604 using a remote display protocol such as ICA or RDP. In general, a server 604 can provide one or more clients access to one or more remote desktops and/or applications. The remote display protocol includes a set of data transfer rules that allow for applications and desktops hosted on server 604 to be displayed on remote client 602 and to receive keystrokes, mouse clicks, touch events, and inputs from users of remote client 602. A remote display protocol used herein may include different types of channels (sometimes referred to as "virtual channels") for sending and receiving different types of data. In the example of FIG. 6, the remote display protocol includes a keyboard channel 630 and a graphics channel 632, which are described below.

Illustrative client 602 includes one or more input devices 606, a remote display client 608, a remote display window 610, and an IME 617, among other hardware and/or software components not shown to promote clarity in the drawing. Input devices 606 can include a physical or virtual input devices (e.g., keyboards, mice, touchscreens, etc.) that generate input events in response to user inputs. Such input events can include keystrokes, mouse clicks, touch events, etc. Client 602 can include device drivers to handle input from corresponding ones of the input devices 606. Remote display client 608 can include one or more drivers (e.g., so-called "virtual drivers") that enable communication with server 604 over one or more remote display protocol channels. Remote display client 608 receives input events (e.g., keystrokes) from input devices 606 and sends corresponding characters to server 604 via the keyboard channel 630. In addition, remote display client 608 receives remote display information from server 604 via the graphics channel 632 and, using this remote display information, causes the remote application 616 to be displayed within remote display window 610. Remote display client 608 may be implemented within a native application or as a browser-based client such as an HTML5 client. In the latter case, remote display window 610 may correspond to browser window and various functionality of the remote display client 608 may be implemented using JavaScript or another scripting language supported by the browser.

Illustrative server 604 includes a remote display server 612 and one or more applications, such as illustrative application 616. Server 604 can include additional hardware and/or software components not shown to promote clarity in the drawing. Remote display server 612 receives input events from client 602 and, in response, provides the input events to one or more applications such as application 616. For example, remote display server 612 can receive keystrokes (or, equivalently, characters corresponding to those keystrokes) via the keyboard channel 630 and, in response, can cause corresponding characters to be entered into an active text input 622 of application 616. Active text input 622 may correspond to a currently focused text input of application 616. Remote display server 612 sends remote display information to client 602 via graphics channel 632 to enable client 602 to display application 616 within remote display window 610. While illustrative application 616 is shown as a web browser (e.g., a remote/virtual browser), the structures and techniques described herein can, in general, be used to access any type of remote applications and desktops. In some cases, server 604 can be a virtualization server configured to provide virtual desktops and/or virtual applications to one or more clients.

As used herein, the term "text input" refers to any type of UI element/control that can receive keystrokes entered by a user. The term "active text input" herein refers to a text input of an application that currently has focus or is otherwise configured to receive keystrokes for the application at the current time. A particular text input of an application may become the active text input when it gains focus and may cease to be the active text input when it loses focus (i.e., an application's active text input can change over time).

Client-side IME 617 presents, or enable the presentation of, a composition window 618 and a candidates window 620. When a user of client 602 generates keystrokes, IME 617 enters corresponding characters (e.g., "n," "i," "h," "a," etc.) into composition window 618. If the user presses the backspace key, the most recently entered character may be deleted from composition window 618. In some cases, composition window 618 may be a transparent text area within the remote display window 610 and, thus, the characters entered into composition window 618 may not be visible. In the case of an HTML5 client, composition window 618 may, for example, correspond to a hidden <div>element. At or around the same time, the keystrokes are sent (e.g., in a dynamic manner) to remote application 616 via the remote display protocol's keyboard channel 630, causing characters to be entered into, or deleted from, the remote application's active text input 622. The server-side active text input 622 also includes a cursor 623 that moves as characters are entered into, or deleted from, active text input 622. Remote display window 610 is subsequently updated via the remote display protocol's graphics channel 632 to reflect the updated state of active text input 622.

Based on characters entered into composition window 618, IME 617 presents, or enable the presentation of, a list of candidate graphemes within candidates window 620. Candidates window 620 may be positioned relative to composition window 618 such that a user can easily view and select candidate graphemes while composing text. For example, as shown in FIG. 6, candidates window 620 may be positioned above composition window 618. In other examples, candidates window 620 may be positioned below composition window 618. After a candidate grapheme is selected, IME 617 sends the selected grapheme, or "composed text," to server 604 via the remote display protocol. Upon receiving the selected grapheme, remote display server 612 replaces the characters within the remote application's active text input 622 with the selected grapheme. In turn, remote display window 610 is updated via the graphics channel 632 to show the selected grapheme inserted into the remote application's active text input 622. At or around the same time, client-side IME 617 clears the composition window 618 (i.e., deletes the characters that were entered into the composition window).

It is appreciated herein that the IME implementation of FIG. 6 may exhibit certain technical problems that negatively impact usability and efficiency. For example, as illustrated in FIG. 6, composition window 618 may be in a fixed position (e.g., a bottom left corner of remote display window 610) and, thus, the candidates window 620 may be located away from the apparent position of active text input 622 within remote display window 610.

Figure 6A:
FIG. 6A illustrates technical problems that can occur with the IME implementation of FIG. 6.
Figure 6A:
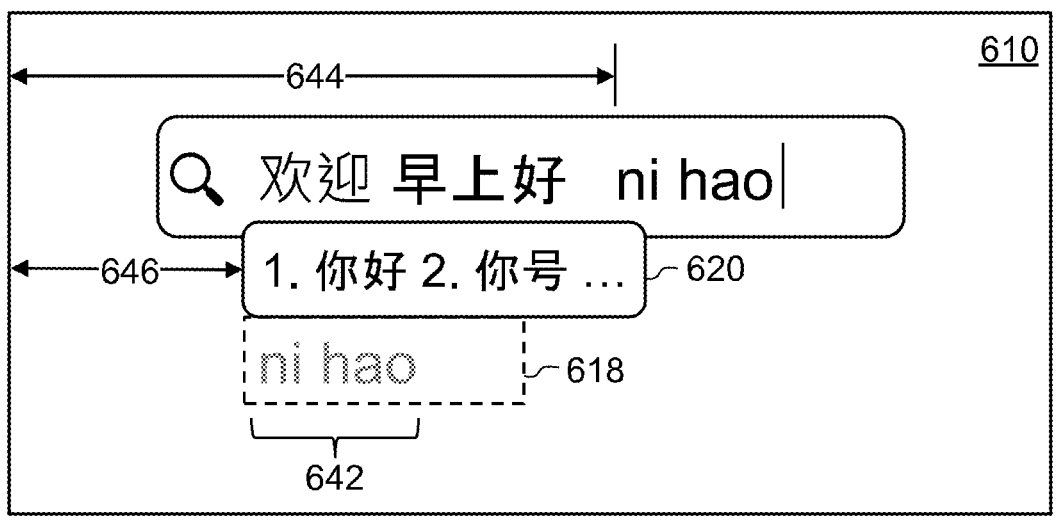

Turning to FIG. 6A, even if the composition window 618 is positioned relatively near to the remote active text input 622 (as displayed within remote display window 610), the IME candidates window 620 may still not be positioned in a convenient or easy-to-use manner. In more detail, assume the user composes graphemes 640 using the IME and the composed graphemes 640 are entered into active text input 622 of remote application 616. At this point, IME composition window 618 is cleared, as previously discussed. Next, the user types some characters 642 (e.g., "ni hao") within the composition window 618. The keystrokes are sent to the server, the characters 642 are appended to the active text input 622 after graphemes 640, and the active text input cursor 623 moves to the right. Thus, the user sees the entered characters 642 at a horizontal position 644 whereas the candidates window 620 (which is positioned relative to the composition window 618) is displayed at a substantially different horizontal position 646. This sort of misalignment may be confusing and inconvenient to the user and may decrease the usability of the IME. In this example, horizontal positions 644, 646 are measured from a left edge of remote display window 610, however other reference points can be used.

The IME implementation of FIG. 6 can exhibit other technical problems. For example, characters entered by the user may become "lost" and the user may be prevented from entering characters after selecting a grapheme from the candidates window 620. These issues can occur, for example, as a result of an unstable network connection between the client and server or due to performance degradation (e.g., high load) on the server. This is because the IME implementation of FIG. 6 can involve a relatively large number of remote display protocol messages (e.g., keyboard channel message).

FIG. 7 shows an example of a client-server environment that can address the aforementioned technical problems by synchronizing text input information over a dedicated remote display protocol channel, according to embodiments of the present disclosure.

An illustrative computing environment 700 includes a client 702 and a server 704 which may be connected via one or more computer networks (not shown) such as the Internet or another wide area network (WAN). In the example shown, client 702 accesses an application 716 running on server 704 using a remote display protocol. In general, server 704 may provide one or more clients with access to one or more remote applications. The remote display protocol can include different types of channels (sometimes referred to as "virtual channels") for sending and receiving different types of data between client 702 and server 704. In the embodiment of FIG. 7, the remote display protocol includes at least a keyboard channel 730, a graphics channel 732, and a text input synchronization channel 734 (or "text channel" for short). In some applications, channel 734 may be referred to as an "IME channel."

In some embodiments, client 702 and/or server 704 may include various hardware and/or software components similar to those described above in the context of device 103 of FIG. 1. In some embodiments, client 702 and server 704 may form a part of a remote-access system, such as the remote access-system of FIG. 2 described above. In some embodiments, server 704 can be a virtualization server such as virtualization server 301 of FIG. 3. For example, remote display server 712 may be provided as part of a virtual desktops/applications component of server 704. In some embodiments, client 702 and server 704 may be part of a cloud-based system, such as a cloud-based system described above in the context of FIG. 4. In some embodiments, server 704 and client 702 may run different OS's. For example, server 704 may run Linux and client 702 may run WINDOWS or MACOS.

Illustrative client 702 includes one or more input devices 706, a remote display client 708, a remote display window 710, and an IME 717, among other hardware and/or software components not shown to promote clarity in the drawing. Input devices 706 can include physical and/or virtual input devices (e.g., keyboards, mice, touchscreens, etc.) that generate input events responsive to a user. Such input events can include keystrokes, mouse clicks, touch events, etc. Client 702 can include device drivers (not shown) to handle input from corresponding ones of the input devices 706.

Remote display client 708 can include the functionality of a conventional remote display client as well as a text input synchronization driver 738 (or "synchronization driver" for short) that enables an improved IME experience for accessing remote applications as described in detail below. Remote display client 708 may be implemented within a native application or as a browser-based client such as an HTML5 client. In the latter case, remote display window 710 may correspond to browser window and various functionality of the remote display client 708 may be implemented using JavaScript or another scripting language supported by the browser. Text input synchronization driver 738 may be implemented as a plugin or extension to an existing remote display client, such as an existing ICA or RDP client.

Client-side IME 717 can render, or cause to be rendered, both a composition window 718 and a candidates window 720. The user can compose text within composition window 718 and select candidate graphemes within candidates window 720. Thus, client-side IME 717 provides users with a fully native IME experience and allows users to use their preferred IME. Composition window 718 and the characters entered therein are visible to a user of client 702, in contrast to composition window 618 used in the environment of FIG. 6.

Of note, within the illustrative remote display window 710 of FIG. 7, only composition window 718 and candidates window 720 are rendered locally on client 702; the remaining visual elements shown within remote display window 710 are rendered on server 704 and displayed on client 702 by way of the remote display protocol.

Illustrative server 704 includes a remote display server 712, application 716, and a text input synchronization module 736 (or "synchronization module" for short), among other hardware and/or software components not shown to promote clarity in the drawing. Remote display server 712 can include the functionality of a conventional remote display server as well as additional functionality described herein that enables an improved IME experience for remote application access.

As shown in FIG. 7, illustrative application 716 can be a web browser running remotely on server 704. In some embodiments, the remote web browser may be the CITRIX SECURE BROWSER SERVICE. For example, the remote web browser may isolate web browsing to protect a corporate network from browser-based attacks. In some embodiments, the remote browser may be based on Chromium. The structures and techniques described herein are not limited to use with remote web browsers and can generally be used in conjunction with any type of remotely accessed application. Illustrative application 716 includes an active text input 722, which may correspond to an HTML <input> or <textarea> element, or other type of UI element/control that can receive keystrokes. While embodiments of the present disclosure are shown and described in the context of composing text for remote applications, the structures and techniques disclosed herein can be applied to other applications such as composing text for remote desktops.

Synchronization module 736 may be provided as a module of application 716 or as a separate application/service on server 704. In the case where application 716 is a web browser, synchronization module 736 may be provided as a JavaScript module that is dynamically injected into a web page loaded by the browser. For example, application 716 may be a browser that is configured to inject JavaScript that implements the disclosed functionality of synchronization module 736 into some or all web pages loaded within the browser.

In operation, a user of client 702 can generate keystrokes using input devices 706 and the keystrokes can be received (or "intercepted") by client-side IME 717. Characters corresponding to the keystrokes are entered into composition window 718 and are visible to the user. In contrast to the environment of FIG. 6, here the keystrokes are not sent to server 704. Based on the characters entered into composition window 718, IME 717 can present, or cause to be presented, one or more candidate graphemes within candidates window 720 which the user can select as substitutes for the entered characters. When the user is finished composing text, the composed text (e.g., one or more graphemes) can be finalized or "committed" by IME 717 and sent to server 704 via the remote display protocol. On the server 704, remote display server 712 receives the composed text and provides it to application 716 where it is inserted into the active text input 722 of application 716 (e.g., into a currently focused HTML input of a web page). In turn, the client-side remote display window 710 can be updated via the remote display protocol to display the committed text within the active text input 722 of remote application 716.

The composed text may be transmitted from client 702 to server 704 via the text channel 734. In more detail, client-side synchronization driver 738 and server-side synchronization module 736 can establish the text channel 734 and initiate a composition session by passing one or more messages via the remote display protocol. The term "composition session" herein refers to logic state of text channel 734 that can be initiated by a first type of message (e.g., a start composition request message/request sent by the client) and subsequently terminated by a second type of message (e.g., an end composition message/request sent by the client). The text channel 734 can be established, for example, when client 702 accesses a remote application or desktop on server 704. A composition session can subsequently be established by the client.

In response to the user finalizing composed text using client-side IME 717, synchronization driver 738 can generate a message that includes the composed text (referred to herein as a "text message") and send the text message to server 704 via text channel 734. The composed text sent to server 704 can include one or more graphemes, as previously discussed. Server-side synchronization module 736 can receive the text message and enter the composed text within the active text input 722 of remote application 716. This can cause a cursor 723 of active text input 722 to change position (e.g., advance to the right).

In response to a change in cursor position or other type of event, synchronization module 736 can determine one or more attributes of cursor 723 and generate and send a message to client 702 that includes the cursor attributes (referred to herein as an "extent message"). The cursor attributes can include, for example, a horizontal ("x") position of the cursor, a vertical ("y") position of the cursor, a width of the cursor, and a height of the cursor. Synchronization module 736 can determine the cursor attributes, for example, by querying the DOM (Document Object Model) of a web page that includes active text input 722. Synchronization module 736 can send an extent message to client 702 in response to one or more types of events. For example, synchronization module 736 may send an extent message including cursor attributes to client 702 in response to a request from client 702 (e.g., in response to a text message or in response to a separate request for extent information). In some embodiments, synchronization module 736 may send an extent message to client 702 when cursor 723 moves, i.e., when the horizontal and/or vertical position of the cursor changes, or when another attribute of cursor 723 changes. In some embodiments, synchronization module 736 may use event listeners to detect (or "listen for") changes to one or more attributes of cursor 723. Additional details regarding the messaging protocol that can be used over via text channel 734 are discussed below in the context of FIG. 8.

Figure 7A:
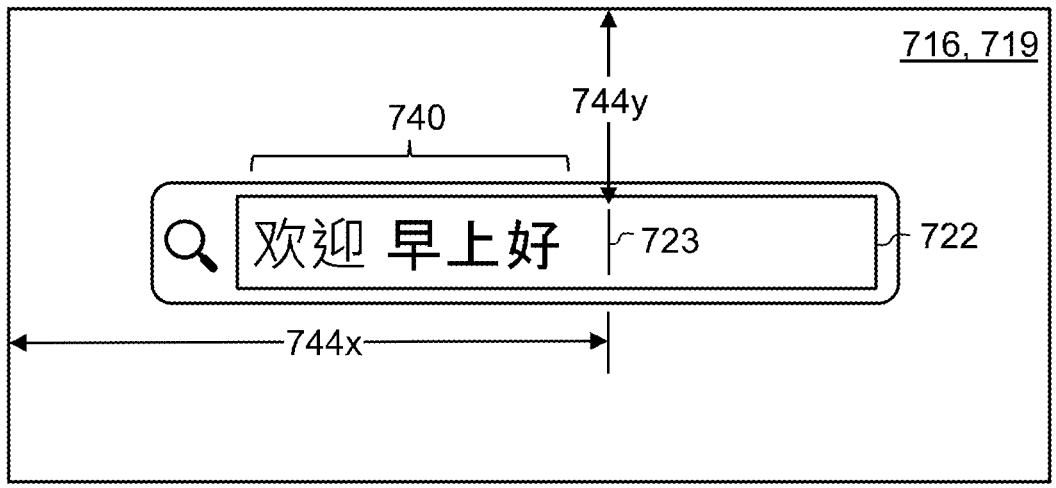
FIG. 7A shows how text input synchronization according to the present disclosure can solve the technical problems illustrated in FIG. 6A.
Figure 7A:
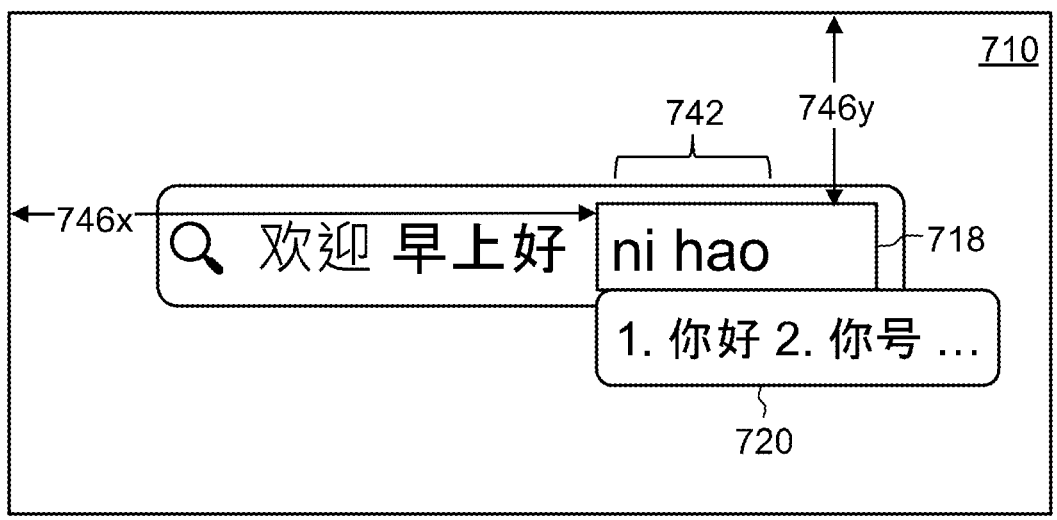

Client-side synchronization driver 738 can receive an extent message via text channel 734 and provide cursor attributes contained therein to IME 717. In turn, client-side IME 717 can use the received cursor attributes to configure composition window 718. In more detail, referring to FIG. 7A and with continued reference to FIG. 7, synchronization module 736 can determine that cursor 723 has horizontal and vertical positions 744*x*, 744*y* relative to the current configuration of application window 719 in which cursor 723 is displayed, and can send these positions (and possibly other cursor attributes) to client 702 as part of an extent message. Application window 719—which may correspond to a top-level window or viewport of application 716—may be resizable and/or may include scrollbars. Thus, the relative position of the cursor 723 within application window 719 may depend on the current window dimensions, scrollbar offsets, or other configuration of application window 719.

Client-side IME 717 can use cursor attributes received from the server 704 to determine a horizontal and vertical positions 746*x*, 746*y* of composition window 718 relative to the current configuration of remote display window 710. In some cases, client-side remote display window 710 and server-side application window 719 can have substantially the same configuration (e.g., in terms of dimensions and/or scrollbar offsets) and, thus, IME 717 can set the composition window positions 746*x*, 746*y* equal to the cursor positions 744*x*, 744*y*. In other cases, remote display window 710 and application window 719 may have different configurations and thus IME 717 may translate cursor positions 744*x*, 744*y* to composition window positions 746*x*, 746*y* based on a difference in configurations between these windows. In general, IME 717 may determine the composition window positions 746*x*, 746*y* so as to give the appearance that characters entered into client-side composition window 718 are being inserted into server-side active text input 722 at or about the current position of cursor 723. For example, if graphemes 740 were previously selected by the user and entered into active text input 722, then IME 717 may position composition window 718 so as to give the appearance that subsequently typed characters 742 are inserted after graphemes 740 (i.e., they are appended to the contents of active text input 722). Moreover, because candidates window 720 is positioned relative to the composition window 718 (e.g., below composition window 718), candidates window 720 will follow the position of cursor 723 in a dynamic fashion. This can improve the usability of IME 717 when composing text for remote applications and desktops.

In some embodiments, synchronization module 736 can determine a width and/or height of cursor 723 and send these attributes to client 702 within an extent message. In turn, client-side IME 717 can use the cursor width and/or height to estimate/calculate a font size of active text input 722 and configure composition window 718 to use the same font size. This can further improve the usability of IME 717.

Figure 8:
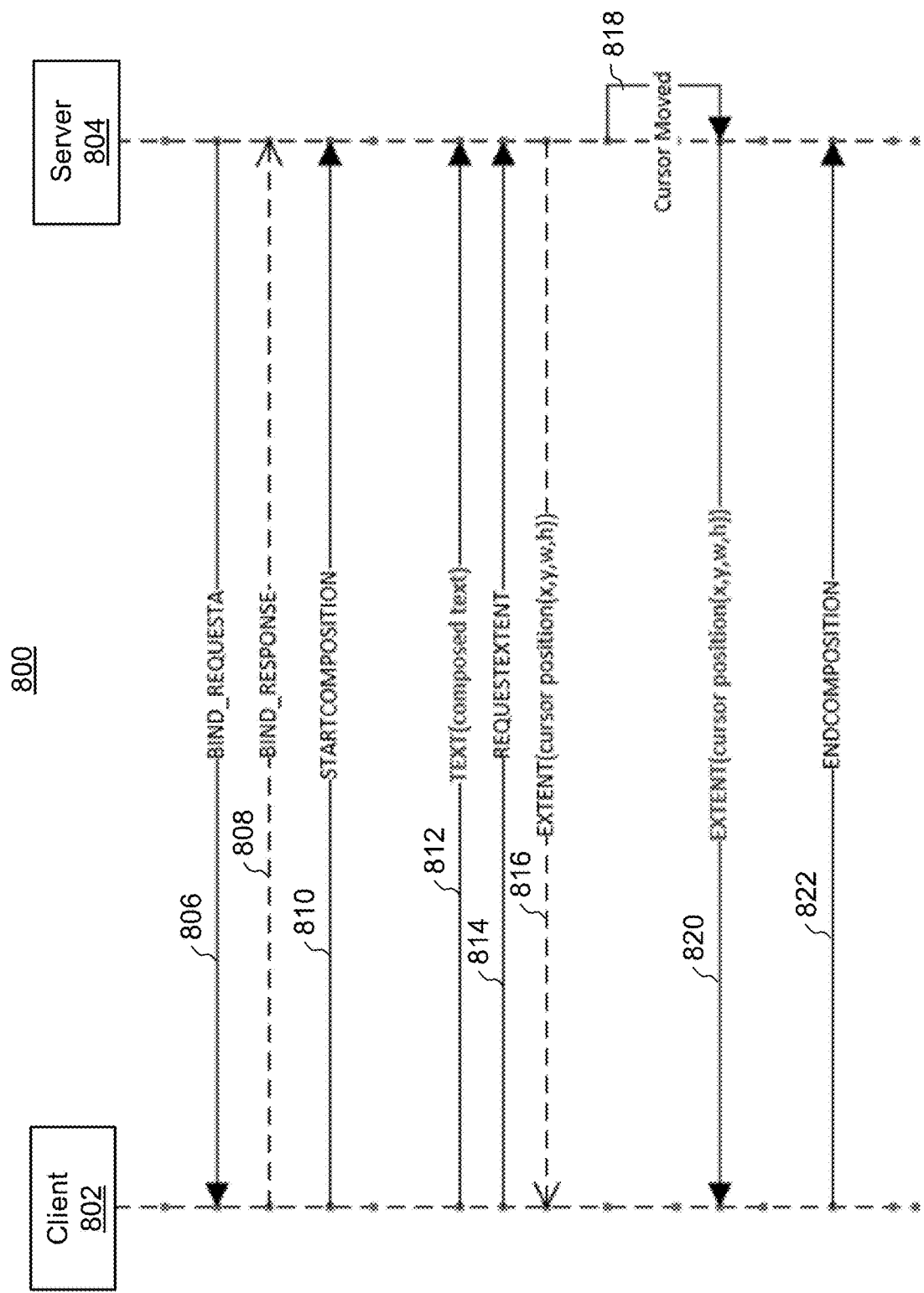
FIG. 8 is an interaction diagram illustrating a messaging protocol that can be used to synchronize text inputs between clients and remote applications, according to embodiments of the present disclosure.

FIG. 8 shows an example of a messaging protocol 800 that can be used to synchronize text inputs between clients and remote applications, according to embodiments of the present disclosure. Messaging protocol 800 can be used, for example, with a text input synchronization channel of a remote display protocol, such as text channel 734 of FIG. 7.

Client 802 and server 804 can establish a text channel using a bind request and a corresponding bind response. In the example of FIG. 8, server 804 sends bind request 806 to client 802 and client responds with bind response 808. The bind request 806 and/or bind response 808 can include predefined capability masks used to communicate the capabilities of server 804 with client 802 or vice versa.

After the text channel is established, client 802 can initiate a composition session by sending a start composition request 810 to server 804. The composition session can be associated with a particular instance of an IME on the client (e.g., IME 717 of FIG. 7) and a particular remote application or desktop running on the server 804 (e.g., application 716 of FIG. 7). The application can have an active text input (e.g., text input 722 of FIG. 7) which in turn can have a cursor (e.g., cursor 723 in FIG. 7). Thus, it may be said that the cursor is associated with the composition session. In some embodiments, client 802 may specify a unique session identifier within the start composition request. In response to receiving the start composition request 810, server 804 may, for example, update a current status of the text channel to indicate that composition has started and/or configure the active text input such that is ready to receive text.

A user of client 802 can compose text (e.g., graphemes) using a client-side IME composition window and candidates window (e.g., windows 718 and 720 of FIG. 7) and, when the user is finished composing, client 802 generates a text message 812 comprising the composed text and sends the text message 812 to server 804. Server 804 can enter (e.g., insert) the composed text into the remote application's active text input. In some embodiments, client 802 and server 804 can have multiple composition sessions active at the same time and client 802 can include a session identifier in the text message 812 and server 804 can use the session identifier identify the composition session (e.g., from among multiple active composition sessions).

At any convenient or useful time(s), client 802 can send an extent request 814 to server 804 and server 804 can respond with an extent response 816. The extent response 816 can include one or more attributes of a cursor associated a composition session (e.g., the composition session initiated by request 810). Examples of such cursor attributes are described above in the context of FIGS. 7 and 7A. In some embodiments, client 802 can include a session identifier in the text message 812 and server 804 can use the session identifier identify the composition session. In the example, of FIG. 8, client 802 sends an extent request 814 after it sends the text message 812. In some cases, a client 802 may send an extent request when a composition session is initiated (e.g., soon after sending request 810) such that client 802 can use the returned cursor attributes to position the IME composition window near the cursor.

In addition to sending cursor attributes in response to an extent request, server 804 may also send cursor attributes to client 802 in response to other event types. For example, as shown in FIG. 8, if the cursor associated with a composition session moves, as indicated by arrow 818, then server 804 can send an extent message 820 including the cursor attributes to client 802.

Client 802 can send an end composition request 822 to terminate a composition session (e.g., the composition session initiated by request 810). In some embodiments, client 802 may send the end composition request 822 in response to an indication from the client-side IME 717 that the user has completed composing text. In some cases, this may be in response to a user pressing a key such as the enter key or the spacebar. In response to receiving the end composition request 822, the server 804 may cause the composed text (i.e., the text received via the text message 812 to be committed to the active text input. Client 802 can include a session identifier in the end composition request 822 and server 804 can use the session identifier identify the composition session to be terminated.

Figure 9:
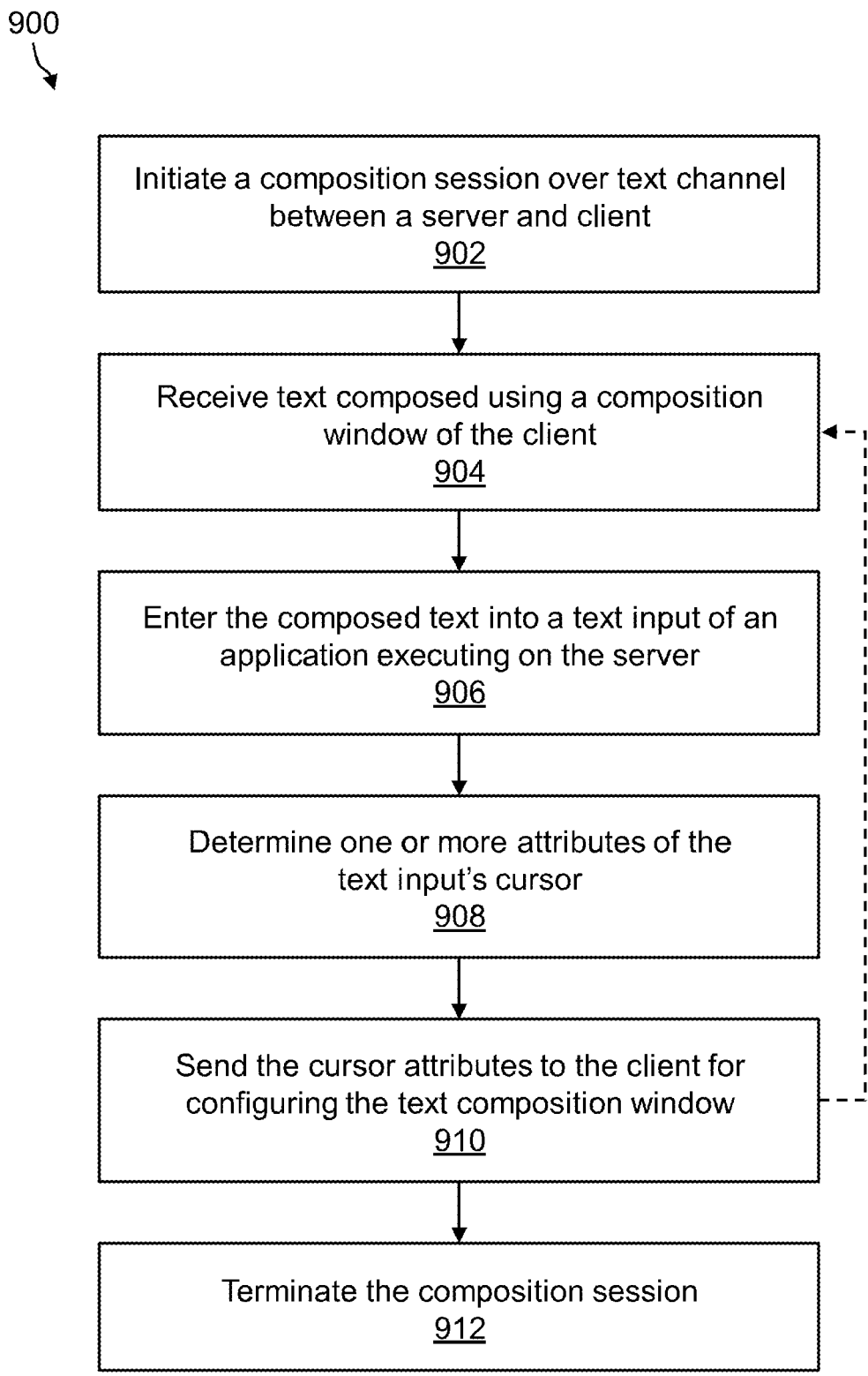
FIGS. 9 and 10 are flow diagrams of illustrative processes for synchronizing text inputs between clients and remote applications, according to embodiments of the present disclosure.
Figure 10:
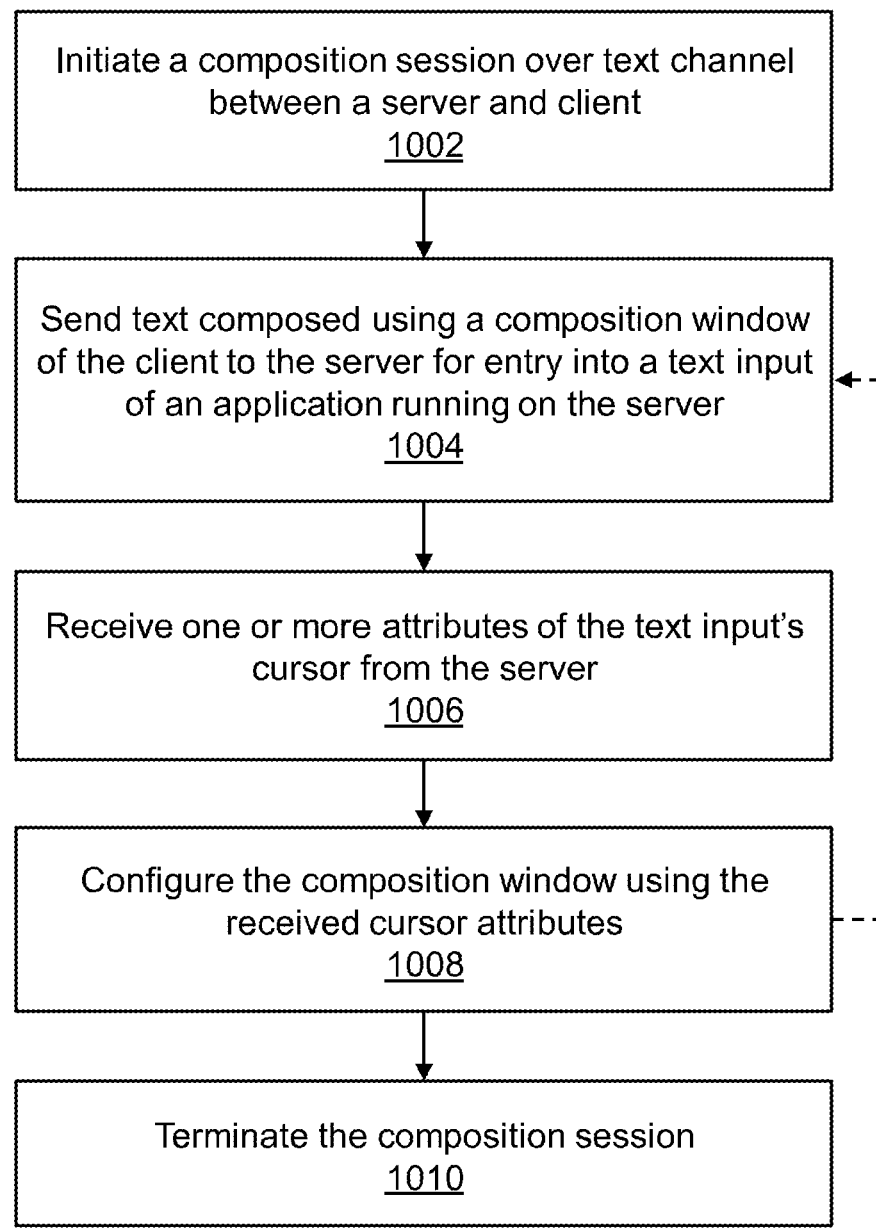

FIGS. 9 and 10 show examples of processes for synchronizing text inputs between clients and remote applications, according to embodiments of the present disclosure. The processes can be utilized, for example, within the client-server environment of FIG. 7. In more detail, the process of FIG. 9 may be performed by a one or more components of a server, such as synchronization module 736 of server 704 of FIG. 7, and the process of FIG. 10 may be performed by a one or more components of a client, such as synchronization driver 738 and IME 717 of client 702 of FIG. 7. In the following description, it is assumed that the client is accessing a remote application running on the server and that the application is displayed on the client (e.g., within remote display window 710 of FIG. 7).

Referring to FIG. 9, an illustrative server-side process 900 can begin at step 902 where a composition session is initiated between the server and the client. In some embodiments, the composition session can be initiated over a text input synchronization channel (or "text channel") of a remote display protocol, such as text channel 734 of FIG. 7. In some embodiments, the text channel can be separate from a keyboard channel of the remote display protocol. In some embodiments, the composition session may be associated with an instance of an IME running on the client and a particular remote application/desktop running on the server.

At block 904, the server can receive composed text (e.g., one or more graphemes) from the client. The received text may be composed using a composition window on the client, such as composition window 718 of FIG. 7. The received text may also be composed using a candidates window, such as candidates window 720 of FIG. 7. In some embodiments, the composition and candidates windows may be part of an IME running on the client. In some embodiments, the client can send the composed text within a text message, such as text message 812 of FIG. 8.

At block 906, the server can enter the composed text into the active text input of the application. For example, the server may insert the composed text at current cursor position. As a result of the composed text being entered, the position of the cursor may change (e.g., it may advance to the right).

At block 908, the server can determine one or more attributes of the text input's cursor, such as its horizontal position, vertical position, width, and/or height. At block 910, the server can send the cursor attributes to the client. The server can send the cursor attributes to the client in response to an explicit request from the client, such as extent request 814 of FIG. 8, and/or in response to an event such as a position of the cursor changing. In the latter case, server may send the cursor attributes within an extent message, such as extent message 820 of FIG. 8.

The client can use the cursor attributes to configure the composition window. For example, the client can use the cursor attributes to position the composition window relative to the application as displayed on the client. As another example, the client can use the cursor attributes to set the size of the font used within the composition window. Various techniques that can be used to configure the client-side composition window based on the position of the server-side cursor are described above in the context of FIGS. 7 and 7A.

The illustrative process 900 can optionally repeat from block 904 as indicated by the dashed arrow. At block 912 the composition session can be terminated by, for example, the client sending an end composition message to the server (e.g., message 822 of FIG. 8). The server may commit the composed text entered into the active text input in response to receiving the end composition message.

Referring to FIG. 10, an illustrative server-side process 1000 can begin at step 1002 where a composition session is initiated between the server and the client. In some embodiments, the composition session can be initiated over a text channel of a remote display protocol, such as text channel 734 of FIG. 7. In some embodiments, the text channel can be separate from a keyboard channel of the remote display protocol. In some embodiments, the composition session may be associated with an instance of an IME running on the client and/or a particular application/desktop running on the server.

At block 1004, the client can second composed text (e.g., one or more graphemes) to the server. The text may be composed using a composition window on the client, such as composition window 718 of FIG. 7. The text may also be composed using a candidates window, such as candidates window 720 of FIG. 7. In some embodiments, the composition and candidates windows may be part of an IME running on the client. In some embodiments, the client can send the composed text within a text message, such as text message 812 of FIG. 8. The server can enter the composed text into the active text input of the application. For example, the server may insert the composed text at current cursor position. As a result of the composed text being entered, the position of the cursor may change (e.g., it may advance to the right).

At block 1006, the client can receive one or more attributes of the text input's cursor from the server, such as the cursor's horizontal position, vertical position, width, and/or height. In some cases, the client may send a request for the cursor attributes, such as extent request 814 of FIG. 8. In other cases, the server may send the cursor attributes in response to an event such as a position of the cursor changing.

At block 1008, the client can use the cursor attributes to configure the composition window. For example, the client can use the cursor attributes to position the composition window relative to the application as displayed on the client. As another example, the client can use the cursor attributes to set the size of the font used within the composition window. Various techniques that can be used to configure the client-side composition window based on the position of the server-side cursor are described above in the context of FIGS. 7 and 7A.

The illustrative process 1000 can optionally repeat from block 1004 as indicated by the dashed arrow. At block 1010 the composition session can be terminated by, for example, the client sending an end composition message to the server (e.g., message 822 of FIG. 8). The server may commit the composed text entered into the active text input in response to receiving the end composition message.

The structures and techniques described above in the context of FIGS. 7-10 can address the various technical problems discussed above in the context in FIGS. 6 and 6A. For example, as previously discussed, environment 700 can position both composition window 718 and candidates window 720 in a convenient and useful manner. Moreover, using a dedicated channel to synchronize committed text (i.e., a text channel 734 that is separate from the keyboard channel 730), environment 700 can solve the problem of lost characters and the problem of users being prevented from entering characters after committing graphemes. For example, the IME implementation of FIG. 7 may significantly reduce the number of remote display protocol messages that need to be sent between the client and server. The disclosed structures and techniques are not limited to IME applications and may be broadly used to synchronize application text inputs in a wide variety of computing environments.

The following examples pertain to further embodiments, from which numerous permutations and configurations will be apparent.

Example 1 includes a method including: receiving, by a first computing device, text composed using a composition window of a second computing device; entering, by the first computing device, the composed text into a text input of an application executing on the first computing device; determining, by the first computing device, one or more attributes of a cursor of the text input, the one or more attributes of the cursor including at least a position of the cursor; and sending, by the first computing device, the one or more attributes of the cursor to the second computing device, the second computing device configured to display the application and to position the composition window relative to the displayed application based on the position of the cursor determined by the first computing device.

Example 2 includes the subject matter of Example 1, wherein the composition window is part of an input method editor (IME) executing on the second computing device.

Example 3 includes the subject matter of Example 2, where the second computing device is configured to position a candidates window relative to the displayed application based on the position of the cursor determined by the first computing device, wherein the candidates window is also part of the IME executing on the second computing device.

Example 4 includes the subject matter of Example 1, wherein the receiving of the text composed using the second computing device includes receiving the composed text over a channel of a remote display protocol.

Example 5 includes the subject matter of Example 4, wherein the remote display includes a keyboard channel separate from the channel over which the composed text is received.

Example 6 includes the subject matter of Example 1 and further includes: initiating, by the first computing device, a composition session with a second computing device, the composition session associated with the application executing on the first computing device.

Example 7 includes the subject matter of Example 1, and further includes: receiving, by the first computing device, a request for the one or more attributes of the cursor, wherein the sending of the one or more attributes of the cursor to the second computing device is responsive to the receiving the request for the one or more attributes of the cursor.

Example 8 includes the subject matter of Example 1, and further includes: responsive to detecting a change in the position of the cursor, sending the changed position of the cursor to the second computing device.

Example 9 includes the subject matter of Example 1, wherein the one or more attributes of the cursor includes a height of the cursor, wherein the second computing device is configured to adjust a font size of the composition window based on the height of the cursor.

Example 10 includes the subject matter of Example 1, wherein the application is a web application and the text input is an HTML element of the web application.

Example 11 includes the subject matter of Example 1, wherein the application is executing within a virtual machine (VM) on the first computing device.

Example 12 includes a method including: sending, by a first computing device, text composed using a composition window of the first computing device to a second computing device, the second computing device configured to enter the composed text into a text input of an application executing on the second computing device and to determine one or more attributes of a cursor of the text input, the one or more attributes of the cursor including at least a position of the cursor; receiving, by the first computing device, the one or more attributes of the cursor from the second computing device, the first computing device displaying the application executing on the second computing device; and positioning, by the first computing device, the composition window relative to the displayed application based on the position of the cursor determined by the second computing device.

Example 13 includes the subject matter of Example 12, wherein the composition window is part of an input method editor (IME) executing on the first computing device.

Example 14 includes the subject matter of Example 13, and further include: positioning, by the first computing device, a candidates window relative to the displayed application based on the position of the cursor determined by the second computing device, wherein the candidates window is also part of the IME executing on the first computing device.

Example 15 includes the subject matter of Example 12, wherein the sending of the text composed using the first computing device includes sending the composed text over a channel of a remote display protocol.

Example 16 includes the subject matter of Example 15, wherein the remote display includes a keyboard channel separate from the channel over which the composed text is received.

Example 17 includes the subject matter of Example 12, and further includes: initiating, by the first computing device, a composition session with a second computing device, the composition session associated with the application executing on the second computing device.

Example 18 includes the subject matter of Example 12, and further includes: sending, by the first computing device, a request for the one or more attributes of the cursor, wherein the receiving of the one or more attributes of the cursor to the second computing device is responsive to the sending of the request for the one or more attributes of the cursor.

Example 19 includes the subject matter of Example 12, wherein the one or more attributes of the cursor includes a height of the cursor, wherein the first computing device is configured to adjust a font size of the composition window based on the height of the cursor.

Example 20 includes a computing device including: a processor; and a non-volatile memory storing computer program code that when executed on the processor causes the processor to execute a process comprising: receiving text composed using another computing device; entering the composed text into a text input of an application executing on the computing device; determining one or more attributes of a cursor of the text input, the one or more attributes of the cursor including at least a position of the cursor; sending the one or more attributes of the cursor to the another computing device, the another computing device configured to display the application and to position a composition window relative to the displayed application based on the position of the cursor determined by the computing device.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the specification to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method comprising:
receiving, by a first computing device, text composed using a composition window rendered initially and locally by a second computing device distinct from the first computing device;
entering, by the first computing device, the composed text into a text input of an application executing on the first computing device;
determining, by the first computing device, one or more attributes of a cursor of the text input, the one or more attributes of the cursor including at least a position of the cursor; and
sending, by the first computing device, the one or more attributes of the cursor to the second computing device, the second computing device configured to display the application and to position the composition window relative to the displayed application based on the position of the cursor determined by the first computing device.

2. The method of claim 1, wherein the composition window is part of an input method editor (IME) executing on the second computing device, wherein the composition window is configured to receive a sequence of characters entered using an input device of the second computing device and to generate characters not natively available on the input device of the second computing device using the received sequence of characters, wherein the composed text received by the first computing device corresponds to the generated characters not natively available on the input device of the second computing device.

3. The method of claim 2, wherein the second computing device is configured to position a candidates window relative to the displayed application at a composition window position based on the position of the cursor sent by the first computing device and received by the second computing device, wherein the candidates window is also part of the IME executing on the second computing device.

4. The method of claim 1, further comprising:
receiving, by the first computing device, a start composition request from the second computing device, the start composition request specifying a composition session identifier; and
initiating, by the first computing device and in response to the start composition request, a composition session with the second computing device, the composition session associated with the application executing on the first computing device and associated with the composition session identifier.

5. The method of claim 1, further comprising:
receiving, by the first computing device, a cursor attribute request for the one or more attributes of the cursor, wherein the sending of the one or more attributes of the cursor to the second computing device is responsive to the receiving the cursor attribute_request for the one or more attributes of the cursor.

6. The method of claim 1, further comprising:
responsive to detecting a change in the position of the cursor, sending the changed position of the cursor to the second computing device.

7. The method of claim 1, wherein the one or more attributes of the cursor includes a height of the cursor, wherein the second computing device is configured to adjust a font size of the composition window based on the height of the cursor.

8. The method of claim 1, wherein the application is a web application and the text input is an HTML element of the web application.

9. The method of claim 1, wherein the application is executing within a virtual machine (VM) on the first computing device.

10. The method of claim 1, further comprising:
rendering, locally via the second computing device, the composition window;
displaying, by the second computing device, the composition window in conjunction with at least one element rendered by the first computing device;
receiving, via an input device of the second computing device, one or more keystrokes corresponding to one or more characters;
entering the one or more characters into the composition window as composed text; and
transmitting, by the second computing device, the composed text to the first computing device.

11. The method of claim 1, wherein:
receiving, by the first computing device, the text comprises receiving, by the first computing device, a message comprising a composition session identifier and the text;
the text input of the application executing on the first computing device is associated with the composition session identifier; and
sending, by the first computing device, the one or more attributes of the cursor to the second computing device comprises sending, by the first computing device, the composition session identifier and the one or more attributes of the cursor to the second computing device.

12. The method of claim 11, wherein the receiving of the text composed using the second computing device includes receiving the composed text over a text input synchronization channel of a remote display protocol, wherein the composition session identifier is associated with the text input synchronization channel.

13. The method of claim 12, wherein the remote display protocol includes a keyboard channel separate from the text input synchronization channel over which the composed text is received.

14. A method comprising:
sending, by a first computing device distinct from a second computing device, text composed using an initially and locally rendered composition window of the first computing device to the second computing device, the second computing device configured to enter the composed text into a text input of an application executing on the second computing device and to determine one or more attributes of a cursor of the text input, the one or more attributes of the cursor including at least a position of the cursor;

receiving, by the first computing device, the one or more attributes of the cursor from the second computing device, the first computing device displaying the application executing on the second computing device; and positioning, by the first computing device, the composition window relative to the displayed application based on the position of the cursor determined by the second computing device.

15. The method of claim 14, wherein the composition window is part of an input method editor (IME) executing on the first computing device, wherein the composition window is configured to receive a sequence of characters entered using an input device of the first computing device and to generate characters not natively available on the input device of the first computing device using the received sequence of characters, wherein the composed text sent to the second computing device corresponds to the generated characters not natively available on the input device of the first computing device.

16. The method of claim 15, further comprising:

positioning, by the first computing device, a candidates window relative to the displayed application at a composition window position based on the position of the cursor sent by the second computing device and received by the first computing device, wherein the candidates window is also part of the IME executing on the first computing device.

17. The method of claim 14, wherein the sending of the text composed using the first computing device includes sending the composed text over a text input synchronization channel of a remote display protocol.

18. The method of claim 17, wherein the remote display protocol includes a keyboard channel separate from the text input synchronization channel over which the composed text is received.

19. The method of claim 14, further comprising:

sending, by the first computing device, a start composition request to the second computing device, the start composition request specifying a composition session identifier; and initiating, by the first computing device, a composition session with the second computing device, the composition session associated with the application executing on the second computing device and associated with the composition session identifier.

20. The method of claim 14, further comprising:

sending, by the first computing device, a cursor attribute request for the one or more attributes of the cursor, wherein the receiving of the one or more attributes of the cursor from the second computing device is responsive to the sending of the cursor attribute request for the one or more attributes of the cursor.

21. A computing device comprising:

a processor; and a non-volatile memory storing computer program code that when executed on the processor causes the processor to execute a process comprising:

receiving text composed using a text input initially and locally rendered by another computing device distinct from the computing device;

entering the composed text into a text input of an application executing on the computing device;

determining one or more attributes of a cursor of the text input, the one or more attributes of the cursor including at least a position of the cursor; and sending the one or more attributes of the cursor to the another computing device, the another computing device configured to display the application and to position a composition window relative to the displayed application based on the position of the cursor determined by the computing device.

* * * * *